US008077336B2

(12) United States Patent
Suzuki (10) Patent No.: US 8,077,336 B2
(45) Date of Patent: Dec. 13, 2011

(54) NETWORK SYSTEM AND INFORMATION PROCESSING DEVICE

(75) Inventor: Satoshi Suzuki, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 735 days.

(21) Appl. No.: 11/955,963

(22) Filed: Dec. 13, 2007

(65) Prior Publication Data

US 2008/0144095 A1 Jun. 19, 2008

(30) Foreign Application Priority Data

Dec. 13, 2006 (JP) ................................. 2006-335320

(51) Int. Cl.
*G06F 3/12* (2006.01)
*H04N 1/32* (2006.01)
(52) U.S. Cl. ...................................... 358/1.15; 358/468
(58) Field of Classification Search ................. 358/1.15, 358/1.9, 2.1, 400, 404, 407, 434, 435, 436, 358/468; 379/100.01, 100.06
See application file for complete search history.

(56) References Cited

U.S. PATENT DOCUMENTS

| | | | | |
|---|---|---|---|---|
| 5,778,071 | A * | 7/1998 | Caputo et al. ................. | 713/159 |
| 6,981,053 | B2 * | 12/2005 | Nagasaka ...................... | 709/232 |
| 7,050,573 | B2 | 5/2006 | Okazaki et al. | |
| 7,190,810 | B2 * | 3/2007 | Tanaka et al. ................. | 382/103 |
| 7,769,837 | B2 * | 8/2010 | Nogawa et al. ............... | 709/222 |
| 7,796,284 | B2 * | 9/2010 | Someya ........................ | 358/1.15 |
| 2005/0182818 | A1 * | 8/2005 | Kawamoto et al. ........... | 709/204 |
| 2006/0002198 | A1 * | 1/2006 | Funahashi et al. ........ | 365/189.11 |
| 2006/0065101 | A1 * | 3/2006 | Funaki .............................. | 84/478 |
| 2007/0049058 | A1 * | 3/2007 | Kobayashi ...................... | 439/13 |

FOREIGN PATENT DOCUMENTS

| | | |
|---|---|---|
| JP | 2000-194628 | 7/2000 |
| JP | 2000-316038 | 11/2000 |
| JP | 2001-333143 | 11/2001 |
| JP | 2004-054633 | 2/2004 |
| JP | 2006-164092 | 6/2006 |

OTHER PUBLICATIONS

Notification of Reasons for Rejection for corresponding Japanese Patent Application No. 2006-335320 mailed Jun. 7, 2011.
"Nike and Apple Team Up to Launch Nike+iPod:Global Collaboration Brings the Worlds of Sports and Music Together Like Never Before" May 23, 2006 http://www.apple.com/jp/news/2006/may/23nike.html (Japanese text and English Translation).

* cited by examiner

Primary Examiner — Jerome Grant, II
(74) Attorney, Agent, or Firm — Banner & Witcoff, Ltd.

(57) ABSTRACT

A network system includes a first device, a second device connectable to the first device via an IP network and an external device detachably connectable to each of the first device and the second device. The first device stores setting information. A first device control unit is provided to control the first device in accordance with the setting information. The first device further includes a first transmitting unit configured to transmit the setting information in response to receipt of a sending request. The second device retrieves the address of the first device that is stored in the external device, and transmits the sending request to the first device via the IP network. Then, with a receiving unit, the setting information transmitted from the first device via the IP network is received. A second control unit controls the second device in accordance with the received setting information.

19 Claims, 6 Drawing Sheets

NETWORK SYSTEM AND INFORMATION PROCESSING DEVICE

CROSS-REFERENCE TO RELATED APPLICATION

This application claims priority under 35 U.S.C. §119 from Japanese Patent Application No. 2006-335320 filed on Dec. 13, 2006. The entire subject matter of the application is incorporated herein by reference.

BACKGROUND

1. Technical Field

The present invention relates to a network system in which setting of a second device on a network can be made identical to the setting of a first device on the network.

2. Related Art

Generally, a plurality of devices are connected to a network, and each device has its own setting items. Conventionally, network management software for managing such setting items has been known. An example of such software is disclosed in Japanese Patent Provisional Publication No. 2000-194628 (hereinafter, referred to as '628 publication). According to '628 publication, if there are some setting items which have not yet set in a device, a computer on which the network management software runs sets the setting items based on the setting items, which have been set, of another device.

According to '628 publication, however, the computer implemented with the network management software is capable of managing only registered devices. In order to manage a new device, an IP address of the new device should be registered in advance. When a user is to use a device outside an office/home, he/she may wish to use the device as a device he/she uses at the office/home. However, it may be generally difficult to obtain the IP address of the device outside the office/home beforehand. Therefore, the device outside the office/home may not be registered in advance, and the user cannot use the device with his/her usual settings.

SUMMARY

The present invention is advantageous in that there is provided a network system in which setting items of a second device can be made identical to those of a first device without leakage of the contents of the setting items, and with a relatively simple operation. There is also provided information processing devices constituting such a network system.

According to aspects of the present invention, there is provided a network system including a first device, a second device which can be connected to the first device via an IP network and an external device detachably connectable to each of the first device and the second device. An address of the first device is stored in the external device. The first device is provided with a setting information storing unit configured to store setting information representing settings of the first device a first device control unit configured to control the first device in accordance with the setting information stored in the setting information storage, and a first transmitting unit configured to transmit the setting information stored in the setting information storage in response to receipt of a sending request, which is a request to send setting information, transmitted from the second device via the IP network. The second device is provided with a retrieving unit configured to retrieve the address stored in the external device connected to the second device, a second transmitting unit configured to transmit the sending request, which requests for the setting information, to the first device via the IP network, based on the address retrieved by the retrieving unit, a receiving unit configured to receive the setting information transmitted from the first device via the IP network and a second device control unit configured to control the second device in accordance with the setting information received by the receiving unit.

According to the above configurations, the settings of the second device can be set to be the same as the settings of the first device with a simple operation, such as an operation of attaching the external device to the first device and second device. Additionally, with the above configuration, since the setting information is not stored in the external device, the leakage of information stored in the first data is prevented even when an unauthorized user uses external device.

According to other aspects of the present invention, there is provided an information processing device connected to an external network device via an IP network, an external device being detachably connectable to the information processing device. The information processing device is provided with a setting information storing unit configured to store the setting information representing setting of the information processing device, a control unit configured to control the information processing device in accordance with the setting information stored in the setting information storing unit, a receiving unit configured to receive a sending request for the setting information from the network device, and a transmitting unit configured to transmit, to the external network device, the setting information stored in the setting information storing unit in response to receipt of a sending request, which is a request to send the setting information, from the external network device.

According to the above configuration, an information processing device functioning as the first device described above, is provided.

According to other aspects of the present invention, there is provided an information processing device connected to an network device via an IP network. An external device, which stores an address of the network device, is detachably connectable to the information processing device. The information processing device is provided with a retrieving unit configured to retrieve the address from the external device, a sending unit configured to send a sending request, which is a request to send the setting information representing setting of the network device, to the network device via the IP network based on the address retrieved by the retrieving unit, a receiving unit configured to receive the setting information transmitted from the network device in response to the sending request via the IP network, and a control unit configured to control the information processing device in accordance with the configuration data received by the receiving unit.

According to the above configuration, an information processing device functioning as the second device described above, is provided.

DETAILED DESCRIPTION

Hereinafter, a network system according to aspects of the present invention will be described with reference to the accompanying drawings.

Figure 1:
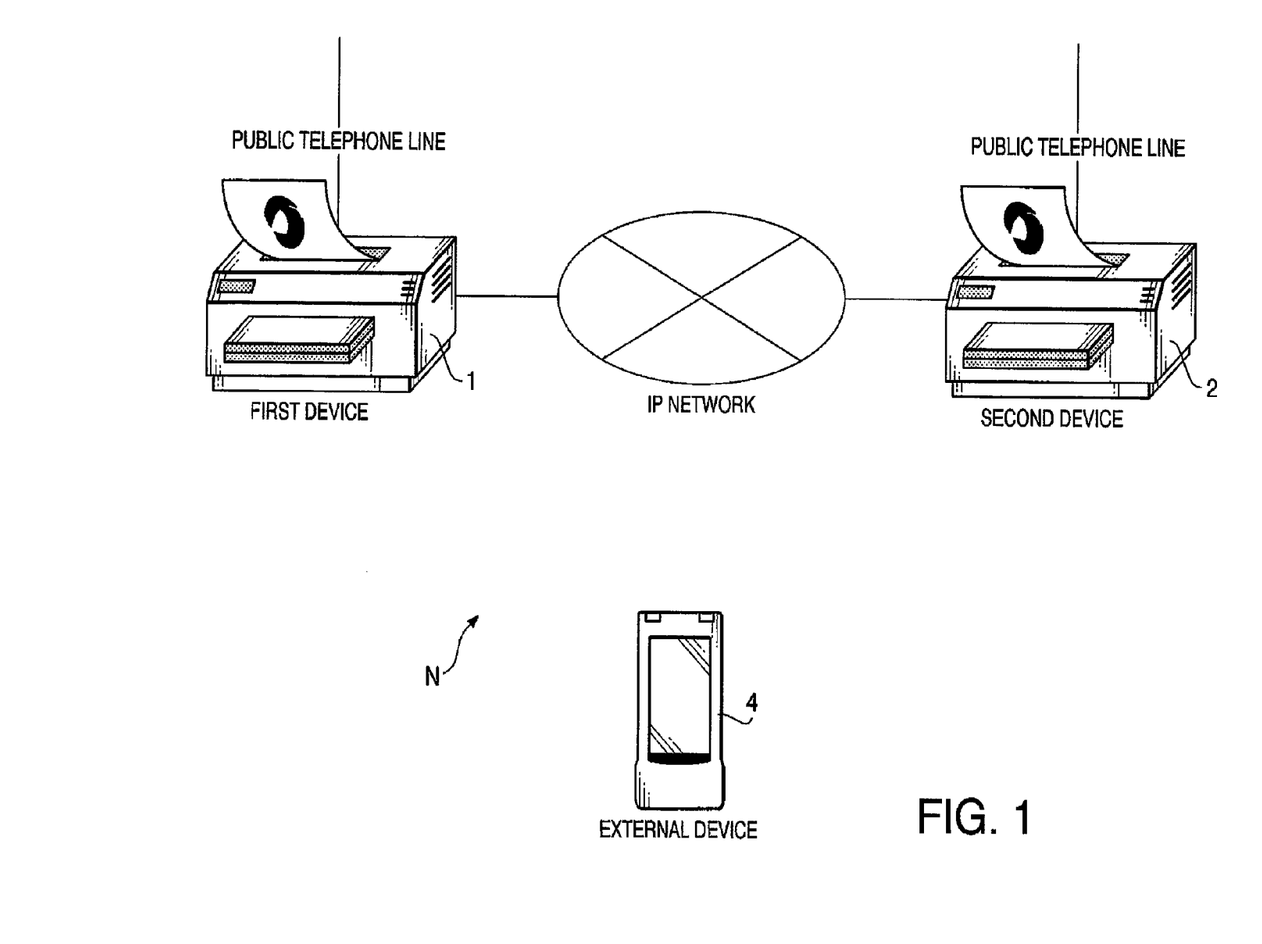
FIG. 1 schematically shows a configuration of a network system in accordance with one or more aspects of the present invention.

FIG. 1 schematically shows a configuration of a network system N according to an embodiment of the present invention. As shown in FIG. 1, the network system N is provided with a first device 1 and a second device 2 which are interconnected via an IP network 100, and a USB (Universal Serial Bus) memory 4.

According to the exemplary embodiment, each of the first device 1 and the second device 2 is an MFP (Multi Function Peripheral) which has a plurality of functions. The IP network 100 includes the Internet and/or LAN (Local Area Network) installed in a specific area such as a company. Each of the first device 1 and the second device 2 is capable of sending/receiving various kinds of information and using an IP telephone system via the IP network 100.

Each of the first device 1 and the second device 2 is provided with interfaces for connecting with the IP network 100 and a telephone line network 200 so as to perform a facsimile function and a telephone function via the IP network 100 and the telephone line network 200. Additionally, each of the first device 1 and the second device 2 is provided with various functions such as a facsimile function, a printer function, a copier function and a scanner function. Further, each of the first device 1 and the second device 2 is provided with a USB terminal so as to write/read various data to/from the USB memory 4 attached thereto.

The USB memory (external device) 4 is a flash memory attached to or detached from the USB terminal of the each of the first device 1 and the second device 2. According to the embodiment, the USB memory 4 is used to store various data such as an IP address and an authentication code.

Firstly, a procedure for making settings of the second device 2 identical to those of the first device 1 will be described. The first device 1 is located, for example, in home and the second device 2 is located, for example, in a hotel room in which a user may stay during a business trip. The first device 1 in home has been customized so that the user of the device can use the first device conveniently. Specifically, settings made by the user may include a telephone directory for storing abbreviated telephone numbers and correct telephone numbers respectively associated with the abbreviated numbers, one-touch dial numbers respectively assigned to a plurality of buttons for designating dial numbers by touching corresponding buttons, and a language setting which defines a language to be used for displaying information on a display unit of the first device 1.

The second device 2 stores the settings which are different from those of the first device 1. Therefore, it is difficult for the user of the first device 1 to use the second device 2. According to the embodiment, the second device 2 is configured to access the first device 1 via the IP network 100, request the first device 1 for setting information of the first device 1, acquire the settings of the first device 1 via the IP network 100, and making the settings of the second device 2 similar to those of the first device 1.

When the second device 2 accesses the first device 1, the user of the second device 2 is required to input the IP address of the first device 1. However, in view of security, it is necessary that an authorized user of the second device 2 cannot access the first device 1. Therefore, it is necessary to confirm that the user of the second device 2 is an authorized user.

For this purpose, the following procedure is employed. That is, the user of the first device 1 connects the USB memory 4 to the first device 1 in home, and stores the IP address and an authentication code of the first device 1 therein, when, for example, the user is to make a business trip. When the user has arrived at the hotel room, he/she connects the USB memory to the second device 2 located in the hotel room.

The second device 2, then, reads the IP address and the authentication code stored in the USB memory 4, and accesses the first device 1 in home. There is a possibility that the user may lose the USB memory 4. In such a case, a person who obtains the USB memory 4 may attempt to use the USB memory 4 and connect to the first device 1. In order to prevent such a problem, the first device 1 stores a password and the user of the second device 2 is required to input the password on the second device 2, as well as connecting the USB memory 4 to the second device. With this configuration, only when the proper password is input, a communication between the first device 1 and second device 2 is established. When the communication between the first device 1 and the second device 2 is established, the setting data stored in the first device 2 is transmitted to the second device 2.

Figure 2:
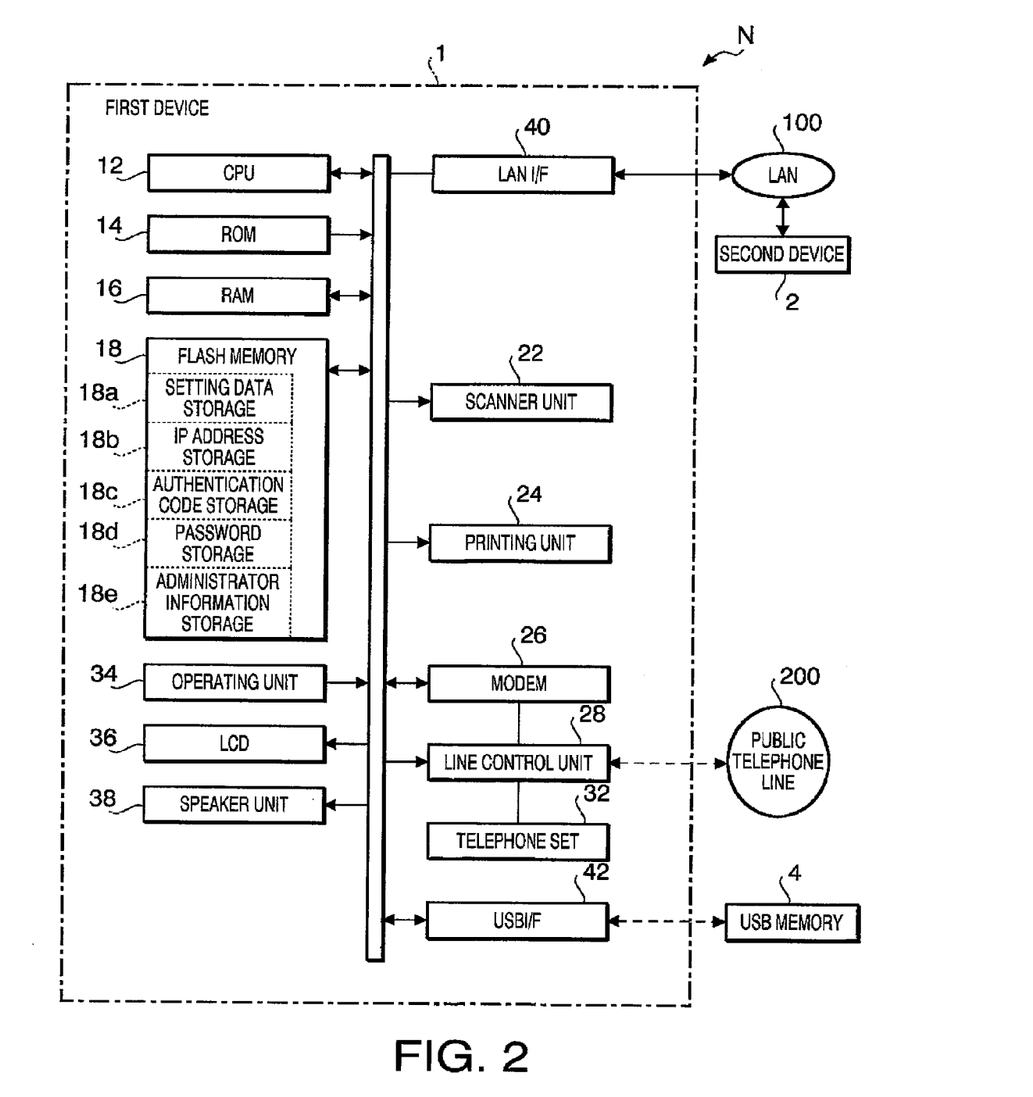
FIG. 2 is a block diagram showing an electrical configuration of a multi function peripheral in accordance with one or more aspects of the present invention.

Next, an electrical configuration of the first device 1 (and the second device 2) will be described. FIG. 2 is a block diagram showing the electrical configuration of the first device 1. According to the exemplary embodiment, the electrical configuration of the first device 1 is the same as that of the second device 2, and only contents stored in a flash memory 18 is different therebetween. Therefore, only the electrical configuration of the first device 1 will be described for brevity.

As shown in FIG. 2, the first device 1 is provided with a CPU 12 for controlling entire operations of the first device 1, a ROM 14 for storing fixed value data and various programs executed by the CPU 12, a RAM 16 for temporarily storing data and programs necessary for various processes executed by the CPU 12, and the flash memory 18 which is a nonvolatile rewritable memory for storing various settings. Further, the first device 1 is provided with a scanning unit 22, a printing unit 24, a modem 26, a line control unit 28, a telephone set 32 for making and receiving a telephone call for the telephone function and an operating unit 34 including a plurality of operation input keys (e.g. buttons or switches) for allowing the user to operate the input keys to perform various functions of the first device 1. The first device 1 is further provided with an Liquid Crystal Display 36 (hereinafter referred to as an "LCD 36") for displaying various information in the first device 1, a speaker unit 38 provided with a speaker and a driving circuit for driving the speaker, an LAN interface unit 40 (hereinafter referred to as "LAN I/F 40") through which the second device 2 is connected to the IP network 100, and a USB interface 42 (hereinafter referred to as "USB I/F 42") including the USB terminal to which the USB memory 4 and the like can be detachably connected.

The CPU 12, the ROM 14, the RAM 16, scanning unit 22, the printing unit 24, the modem 26, the line control unit 28, the operating unit 34, the LCD 36, the speaker unit 38, the LAN I/F 40 and the USB I/F 42 are interconnected via a bus line 46. The line control unit 28 is connected with the modem 26 and the telephone set 32 via transmission paths.

The operating unit 34 is provided with a menu key for selecting a menu, cursor keys for moving a cursor, alphanumeric keys for inputting alphanumeric characters/values, one-touch dial keys for inputting dial numbers using a one-touch dialing function.

The scanning unit 22 is configured to scan an image from a document loaded on a predetermined scanning position and generate image data therefrom in response to an instruction from the CPU 12. When the first device 1 is set to a facsimile mode for performing the facsimile function, the image data scanned by the scanning unit 22 is transmitted to a destination device (e.g., a facsimile device) designated by a dial number input by the user, through the modem 26, line control unit 28 and telephone line network 200.

When the first device 1 is set to operate as a copier mode for performing the copier function, the image data scanned by the scanning unit 22 is printed on a recording sheet by the printing unit 24.

When the first device 1 is set to operate as a scanner mode for performing the scanning function, the image data scanned by the scanning unit 22 is stored in a predetermined storage area of the RAM 16.

According to the exemplary embodiment, the printing unit 24 is an inkjet printer configured to print out image data on the recording sheet fed from a predetermined feeding position, in response to an instruction from the CPU 12. The printing unit 24 is configured to have a well-known structure, and provided with a feeding motor for feeding the recording sheet, a print head for ejecting an ink to the recording medium and a carriage motor for moving a carriage on which the print head is mounted.

When the first device 1 is set to print a facsimile data received from an originating device via the telephone line network 200, the line control unit 28 and the modem 26, image data generated based on the received facsimile data is printed on the recording sheet by the printing unit 24.

The modem 26 is configured to modulate the image data scanned by the scanning unit 22 to generate an image signal which is to be sent to the telephone line network 200 via the line control unit 28, and demodulate an image signal, which is received from the telephone line network 200 via the line control unit 28, to generate image data.

The line control unit 28 is configured to receive various signals from the telephone line network 200, and transmit various signals to the telephone line network 200. Specifically, the line control unit 28 sets the transmission path serving as a transmission destination to which the signal is transmitted from the telephone line network 200 and/or transmission source from which the signals is transmitted to the telephone line network 200. When the image data is sent to the telephone line network 200 as the operating unit 34 (i.e. when facsimile data is sent) is operated by the user, or when an image signal is received from the telephone line network 200 (i.e. when facsimile data is received), a path toward to the modem 26 is set as the transmission path. Then, the image signal can be transmitted/received through the transmission path. The transmission path set as above is released (i.e., disconnected) when the output of the image signal by the modem 26 is terminated or the input of the image signal from the telephone line network 200 is terminated. Consequently, the image signal cannot be sent/received through the transmission path.

The flash memory 18 is provided with a setting data storage 18*a*, IP address storage 18*b* for storing the IP address of the first device 1, authentication code memory 18*c*, password storage 18*d* and administrator information storage 18*e* for storing a dial number of an administrator of the network system.

The setting data storage 18*a* stores various settings such as settings of a telephone directory containing dial numbers respectively associated with abbreviated numbers, one-touch dial numbers respectively corresponding to a plurality of one-touch dial keys, and a language type (e.g., Japanese, English, etc.) to be used for displaying information on the LCD36. These configurations may be set by the user through the operating unit 34 and/or by a computer which is connected to the first device 1 via the IP network 100.

The IP address storage 18*b* stores the IP address assigned to the first device 1. The authentication code storage 18*c* stores an authentication code as identification information for judging whether an access from an external device via the IP network 100 is authorized. The authentication code is formed from, for example, a plurality of codes including a manufacturing number of the USB memory 4, a manufacturing number of the first device 1, and the like. The authentication code may be arbitrarily set by the user or automatically set by the first device 1. For example, the first device 1 may be configured such that a 10-digit random number is automatically generated when the first device 1 is manufactured and powered on at the first time, and the 10-digit number is used as the authentication code of the first device 1.

When the USB memory 4 is connected to the first device 1, the IP address and the authentication code of the first device 1 is written to the USB memory 4. Subsequently, when the USB memory 4 is connected to the second device 2 (for example, in a hotel room), the IP address and the authentication code of the first device 1 stored in the USB memory 4 are retrieved by the second device 2.

If the IP network to which the second device 2 is connected is provided with a Domain Name Server, and an environment where the IP address of the first device 1 can be obtained based on, for example, a URL of the first device 1 by the name resolution is available, the "address" stored in the USB memory 4 can be the URL and need not be the IP address. In the following description, however, for the sake of explanation, a case where the IP address is stored in the USB memory 4 will be described.

Then, the second device 2 accesses the retrieved IP address, and transmits the retrieved authentication code to the first device 1, thereby the second device 2 can be authenticated by the first device 1.

The password storage 18*d* stores a password which also serves as identification information as the authentication code does. The password is arbitrarily set by the user. It should be noted that the password is not stored in the USB memory 4. The password should be input by the user through the operating unit 34 of the second device 2. Then, the password is transmitted to the first device together with the authentication code. With the above configuration, an access by an unauthorized person is prevented, even if the unauthorized person has the USB memory 4.

The administrator information storage 18*e* stores dial numbers such as a dial number of a cellular phone of the user (administrator), which is used for calling the user to notify that the authentication is failed and/or the authentication code is to be deleted from the first device 1. The administrator information storage 18*e* may store e-mail addresses of the cellular phone of the user instead of the dial numbers, so that notification can be made by e-mail.

The USB I/F 42 communicably interfaces the first device 1 and an external device which is detachably connected to the USB terminal of the first device 1. In the network system according to the embodiment, the USB memory 4 is used as the external device. As described above, the USB memory 4 stores the IP address and the authentication code of the first device 1. Such information stored in the USB memory 4 is read by the second device 2 when connected to the USB terminal of the second device 2.

Meanwhile, until the USB memory 4 is connected to the second device 2, the setting data storage 18a, the authentication code storage 18c and the password storage 18d of the second device 2 are set to the factory default information or information stored at the hotel. When the USB memory 4 is connected to the second device 2, the information (settings) stored in the setting data storage 18a in the first device 1 is transmitted to the setting data storage 18a of the second device 2.

Specifically, as described above, when the USB memory 4 is connected to the second device 2, it retrieves the IP address and the authentication code from the USB memory 4. Then, the second device 2 requests the user to input the password. When the user input the password as requested, the second device 2 transmits a remote setting request for the setting data, together with the authentication code and the input password, to the first device 1 having the IP address which is retrieved from the USB memory 4 via the IP network 100.

When the remote setting request is received from the second device 2, the first device 1 judges whether the authentication code and the password included in the remote setting request are correct. If the authentication code and the password are judged to be correct, the first device 1 transmits the setting data stored in the setting data storage 18a to the second device 2.

Figure 3:
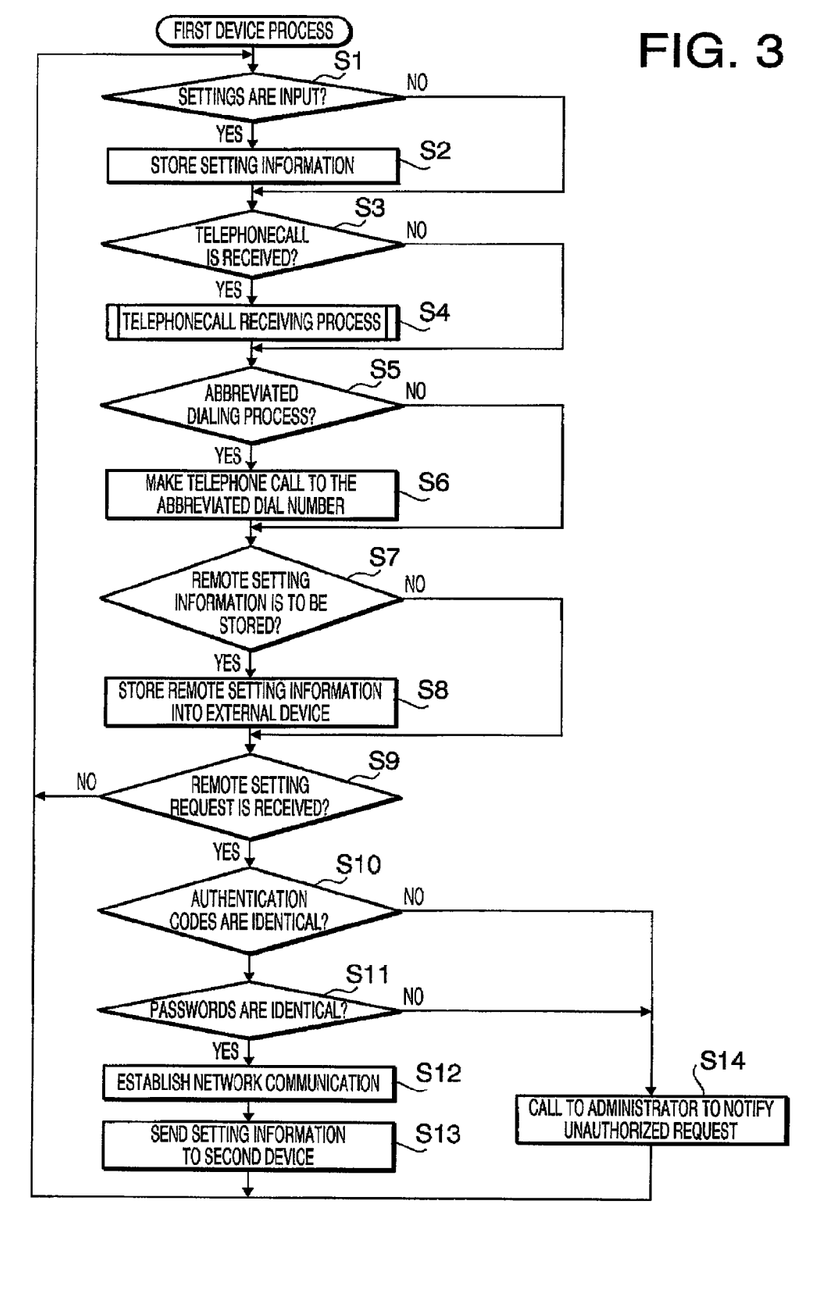
FIG. 3 is a flowchart showing a first device process performed by a first device in accordance with one or more aspects of the present invention.

FIG. 3 is a flowchart showing a first device processes executed by the CPU 12 of the first device 1. These processes are initiated when the first device 1 is powered on, and repeated until the first device 1 is powered off.

When the first device process is started, the process judges whether various settings are performed (S1). The various settings include a registration, editing and deleting of the telephone directory, setting of one-touch dial, setting of the language to be used for display on the LCD 36, and settings of the password and the authentication code. The user can make the various settings through the operation unit 34 and/or through the computer connected to the first device 1 via the IP network 100.

If the process judges that the various settings have been performed (S1: YES), the process stores the setting data representing the various settings in the setting data storage 18a defined in the flash memory 18 (S2). When the authentication code is input, the process stores the input authentication code in the authentication code storage 18c, and when the password is input, the process stores the input password in the password storage 18d.

If the process executes step S2 or the process judges that various settings have not yet been made (S1: NO), the process judges whether a telephone call is received (S3). If the telephone call is received (S3: YES), the process executes a telephone call receiving process (S4). As mentioned above, there are two types of telephone calls, that is, a normal telephone call, and a telephone call for deleting the authentication code or the password stored in the first device 1.

If the telephone call is not received (S3: NO) or after execution of step S4, the process judges whether an abbreviated dialing operation is performed (S5). The abbreviated dialing operation includes an operation of an abbreviated dial number and an operation of the one-touch dial key. When the abbreviated dialing operation is performed (S5: YES), the process makes a telephone call to a dial number referring to the telephone directory stored in the setting data storage 18a (S6).

If the abbreviated dialing operation is not performed (S5: NO) or after execution of step S6, the process judges whether an operation to make an instruction for storing the IP address and the authentication code (hereinafter, collectively referred to as "remote setting information") into the USB memory 4 is performed (S7). The operation to make the instruction is done as the user operates the operation keys of the operating unit 34. If the operation to issue the instruction for storing the remote setting information is performed (S7: YES), the process stores the IP address, which is stored in the IP address storage 18b, and the authentication code, which is stored in the authentication code storage 18c, in the USB memory 4 (S8).

If the instruction for storing the remote setting information is not received (S9: NO) or after execution of step S8, the process judges whether a remote setting request is received from the second device 2 via the IP network 100 (S9). If the remote setting request is received (S9: YES), the process judges whether the authentication code as received is identical to the authentication code stored in the authentication code storage 18c of the first device 1 (S10).

If the authentication code received from the second device 2 is identical to the authentication code stored in the authentication code storage 18c (S10: YES), the process judges whether the password as received is identical to the password stored in the password storage 18d of the first device 1 (S11). If the password received from the second device 2 is identical to the password stored in the password storage 18d (S11: YES), the process determines that the user of the second device 2 is an authorized person, and establishes a communication with the second device 2 via the IP network 100 (S12). Then, the process transmits the setting data stored in the setting data storage 18a of the first device 1 to the second device 2 (S13).

If the authentication code received from the second device 2 is not identical to the authentication code stored in the authentication code storage 18c (S10: NO), or if the password received from the second device 2 is not identical to the password stored in the password storage 18d (S11: NO), the process determines that the user of the second device 2 is an unauthorized person, and notifies the user (administrator) that the unauthorized remote setting request has been received by making a telephone call with reference to the administrator information storage 18e (S14). After execution of steps S13 or S14, or if the remote setting request is not received (S9: NO), the process returns to S1.

Figure 4:
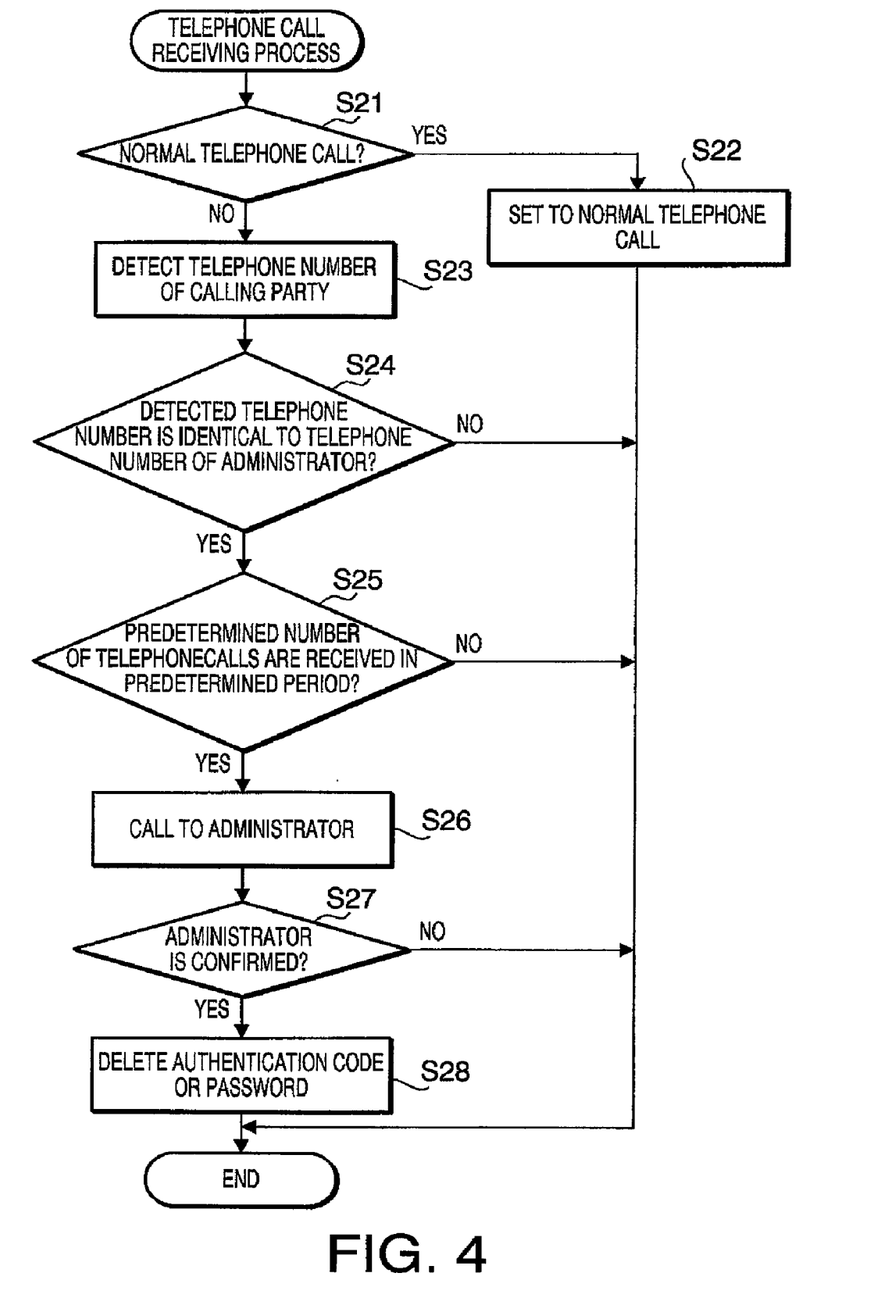
FIG. 4 is a flowchart illustrating a telephone receiving process which is called in the first device process shown in FIG. 3.

Next, the telephone call receiving process called in S4 will be described. FIG. 4 is a flowchart showing the telephone call receiving process.

When the telephone call receiving process starts, the process judges whether the received telephone call is a normal telephone call (S21). If the received telephone call is the normal telephone call (S21: YES), the process allows a normal telephone communication with a calling party (S22).

If the received telephone call is not the normal telephone call (S21: NO), the CPU 12 determines that the received telephone call is a telephone call for deleting the authentication code or the password stored in the first device 1. Therefore, in this case, the process detects the telephone number of the calling party (S23). Subsequently, the process judges whether the detected telephone number is identical to the telephone number stored in the administrator information storage 18e (S24).

If the detected telephone number is identical to the telephone number stored in the administrator information storage 18e (S24: YES), the process determines that the calling party is the administrator. According to the embodiment, if a predetermined number of telephone calls are made from the administrator within a predetermined time period, the process controls the line control unit 28 to make a telephone call to the administrator. Therefore, when the process firstly determines that the telephone call from the administrator is received, a timer (not shown) is started to measure a time period therefrom. Further, the process counts the number of telephone calls received from the administrator. When the telephone call from the administrator is received first time, the process judges that the predetermined number of telephone calls have not yet made (S25).

Thereafter, when further telephone calls are received from the administrator, the process judges whether the predetermined number of telephone calls are received in the predetermined time period (S25). For example, when the predetermined number is three (3) and the predetermined time period is five (5) minutes, the process judges whether three telephone calls have been received from the administrator in five minutes starting from the first telephone call from the administrator was received. If the predetermined number of telephone calls have been received in the predetermined time period (S25: YES), the process controls the line control unit 28 to call the administrator (S26) and confirms that the instruction for deleting the authentication code or the password is intended by the authorized user (i.e., the administrator) (S27). This confirmation may be modified such that the administrator is required to input the password or other specific code. Since the first device 1 makes a telephone call to the administrator, unauthorized communication will be avoided.

If the calling party is confirmed as the authorized user (e.g., administrator) (S27: YES), the authentication code and/or the password are deleted (S28). The confirmation in S27 may be done when the administrator simply receives the telephone call. That is, the process has already recognized that the administrator has made the telephone call by the predetermined times within the predetermined time period (S25), the telephone call from the first device to the administrator is only to confirm that the administrator intends to delete the authentication code and/or the password. Further, with this confirmation process, the administrator is notified that the authentication code and/or the password are deleted. Alternatively, step S27 may acquire administrator's input of authentication code and/or the password. In this case, the administrator may input the authentication code and/or the password to be deleted. Then, the process compares the authentication code and/or the password as acquired with the same stored in the authentication code storage 18d and/or the password storage 18d, and only when the acquired authentication code and/or the password are identical to those stored in the authentication code storage 18d and/or the password storage 18d, the process deletes the authentication code and/or the password.

After execution of S28, if the detected telephone number is not identical to the telephone number stored in the administrator information storage 18e (S24: NO), if the predetermined number of telephone calls have not been received within the predetermined time period (S25: NO) or if the calling party is confirmed as the unauthorized person (S27: NO), the telephone call receiving process is terminated without deleting the authentication code or the password.

As described above, the authentication code or the password is deleted only when it is confirmed that the instruction for deletion intended by the administrator. Therefore, unauthorized access to the first device 1 is prevented even when the USB memory 4 is used by an unauthorized person or the authentication code or the password is unintentionally known by the third party. That is, according to the embodiment, the network connection is established (S12) on condition that the authentication code received from the second device 2 is identical to the authentication code stored in the authentication code storage 18c (S10: YES) and further the password received from the second device 2 is identical to the password stored in the password storage 18d (S11: YES). Therefore, by deleting at least one of the authentication code or the password, the network connection cannot be established.

Figure 5:
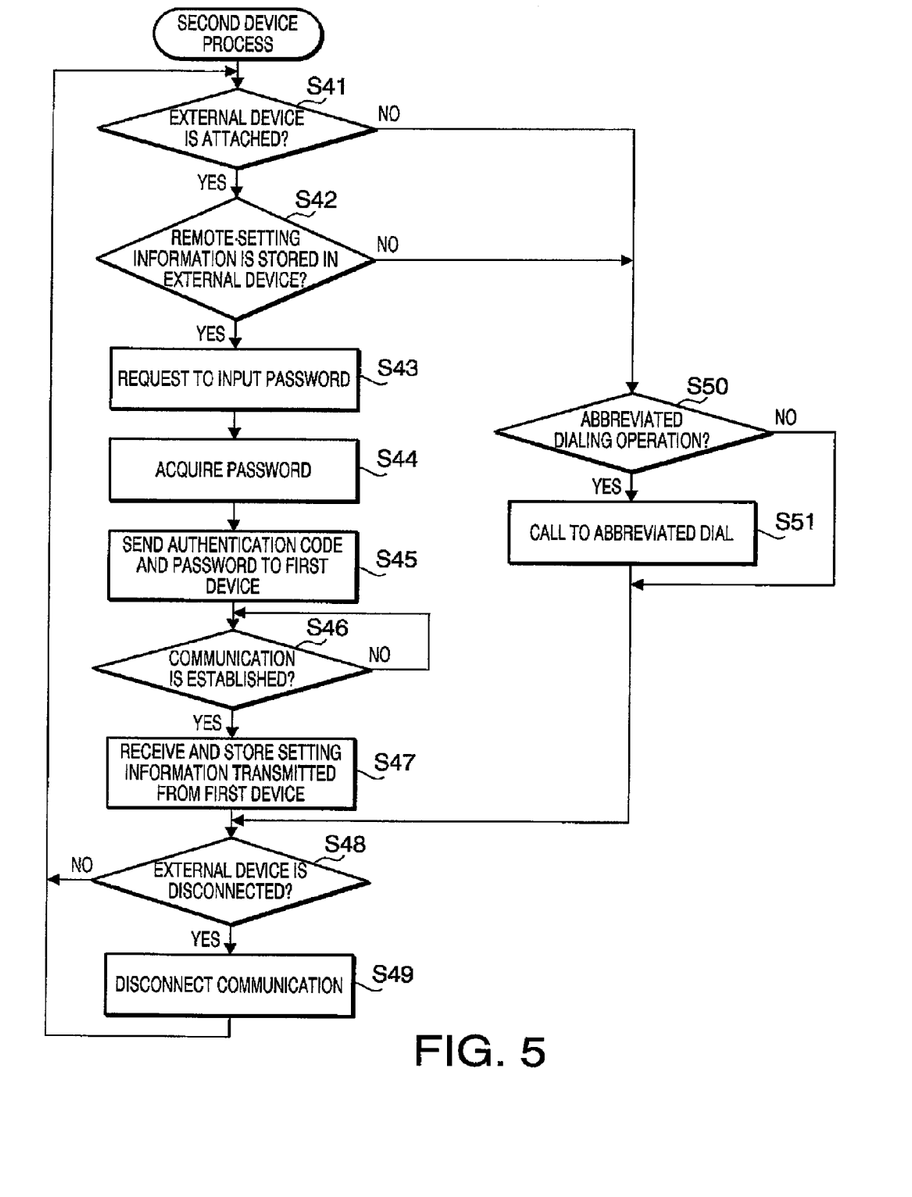
FIG. 5 is a flowchart illustrating a second device process performed by a second device in accordance with one or more aspects of the present invention.

FIG. 5 is a flowchart showing the second device process executed by the CPU 12 of the second device 2. The second device process is started when the second device 2 is powered on, which is repeatedly executed until the second device 2 is powered off.

In S41, the process judges whether the USB memory 4 has been connected to the second device 2. Specifically, in S41, the process judges whether a state where the USB memory 4 is not connected to the second device 2 has changed to a state where the USB memory 4 is connected to the second device 2. Thereafter, as far as the state where the USB memory 4 is connected to the second device 2 is maintained, the judgment in S41 is "NO." If the USB memory 4 is connected (S41: YES), the process judges whether the remote setting information including the IP address and the authentication code is stored in the USB memory 4 (S42). If the remote setting information is stored in the USB memory 4 (S42: YES), the process retrieves the IP address and the authentication code from the USB memory 4, and requests the user to input a password (S43). This request is made by displaying a dialogue with a message asking the user to input the password on the LCD 36 of the second device 2.

Then, the process acquires the password input by the user through the operating unit 34 (S44). When the password is acquired, the process transmits a transmission request for the setting data to the IP address retrieved from the USB memory 4 via the IP network 100 together with the password input by the user and the authentication code retrieved from the USB memory 4 (S45).

In S46, the process pauses until the communication with the first device 1 is established after the authentication is successfully completed based on the transmitted password and the authentication code (S46). If the communication is established (S46: YES), the process receives the setting data from the first device 1 via the IP network 100, and stores the received setting data in the setting data storage 18a of the second device 2.

Meanwhile, if the connected status of the USB memory 4 has not been changed from the disconnected status to the connected status (S41: NO), or if the remote setting information is not stored in the USB memory 4 (S42: NO), the process judges whether an abbreviated dialing operation is performed (S50). If the abbreviated dialing operation is performed (S50: YES), the process makes a telephone call to a telephone number corresponding to the user's operation with referring to the telephone directory stored in the setting data storage 18a (S51).

After execution of S47 or S50, or if the abbreviated dialing operation is not performed (S50: NO), the process judges whether the USB memory 4 is disconnected from the second device 2 (S48). Specifically, in S48, the process judges whether a status where the USB memory 4 is connected to the second device 2 has changed to a status where the USB memory 4 is disconnected to the second device 2. Thereafter, as far as the state where the USB memory 4 is disconnected to the second device 2 is maintained, the judgment in S48 is "NO." If the USB memory 4 is disconnected (S48: YES), the process disconnects the network communication with the first device 1, and deletes the setting data stored in the setting data storage 18*a*, or restores the setting data in the configuration data storage 18*a* to default data (S49).

As described above, firstly, the user connects the external device (e.g., the USB memory 4) to the first device 1, and stores the IP address assigned to the first device 1 and the authentication code. Then, the user connects the external device to the second device 2, and inputs a password. Then, the authentication is performed and the setting data of the first device 1 is transmitted to the second device 2. Thus, with a relatively simple operation, the settings of the second device 2 can be made similar to those of the first device 1. Once the settings of the second device 2 are made as above, the user can use the second device 2 in the same manner as the user uses first device 1.

Since the authentication is made using the password which is not stored in the external device, leakage of the setting data of the first device 1 and/or unauthorized access to the first device 1 can be prevented even if the user mislaid the external device.

Further, the authentication code and/or the password can be deleted simply by making a telephone call from remote locations. Therefore, if there is a possibility of leakage of the authentication code and/or the password, the user can prevent leakage of the setting data of the first device 1 and/or the unauthorized access to the first device 1 by deleting the authentication code and/or the password.

In the above-described exemplary embodiment, sharing of the settings such as the telephone directory between the first device 1 and the second device 2 is explained. Optionally or alternatively, the network system according to the present invention may be configured to transfer a telephone call received by the first device 1 to the second device 2. Specifically, when the communication between the first device 1 and the second device 2 via the IP network is established, the first device 1 may be configured to transfer a facsimile message or a telephone call received by the first device 1 to the second device 2, and the second device may accordingly be configured to receive the facsimile message transferred from the first device 1, or receive the telephone call from the first device 1 (i.e., perform a telephone communication via the first device 1). With this configuration, the second device 2 can be used as a subsidiary handset (e.g., a cordless handset) of the first device.

Figure 6:
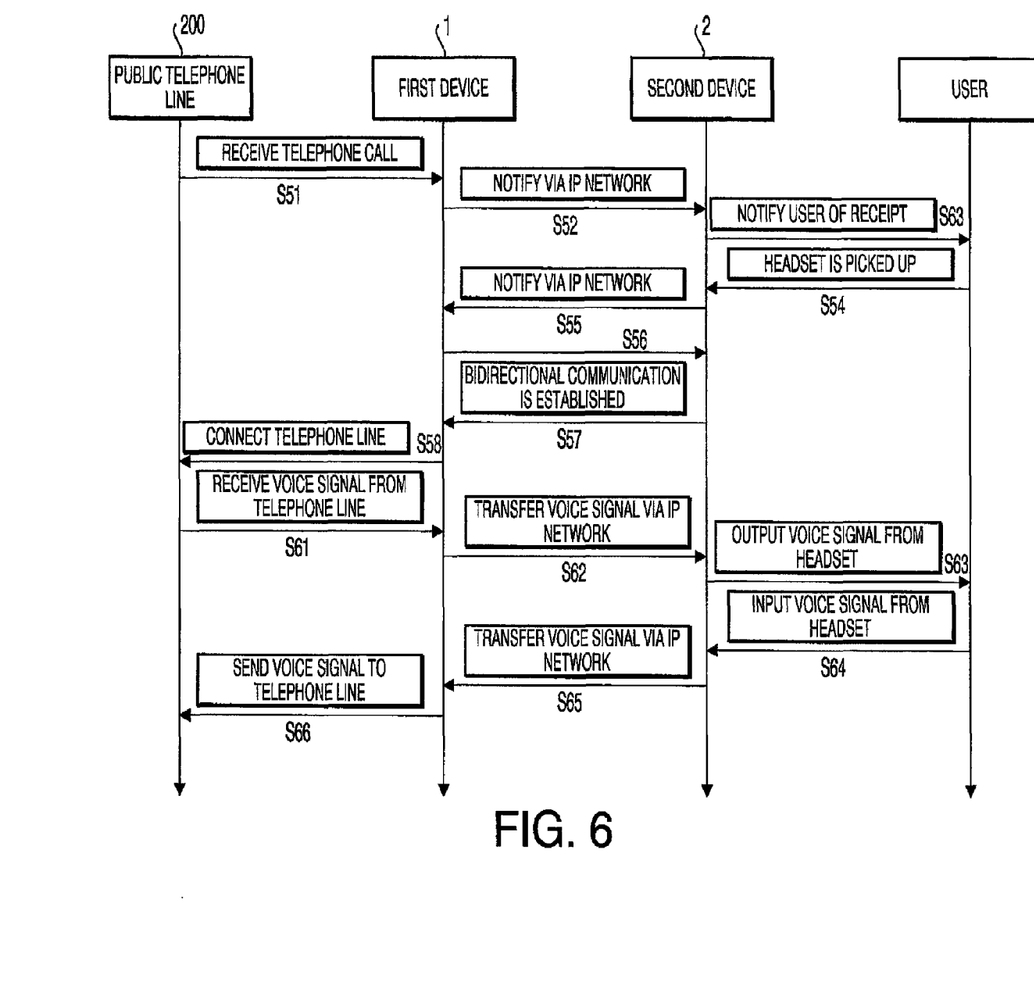
FIG. 6 is a flow diagram illustrating a procedure for transferring a telephone call in accordance with one or more aspects of the present invention.

FIG. 6 is a flow diagram showing a procedure for enabling transfer of telephone call between the first device 1 and the second device 2.

Firstly, the first device 1 receives a telephone call from the telephone line network 200 (S51). The first device 1 notifies the second device 2 of reception of the telephone call, via the IP network 100 (S52). The second device 2 rings a ringtone to notify the user of reception of the telephone call in response to reception of the notification from the first device 1 (S53). Then, the user picks up a telephone set 32 of the second device 2 (S54). When the second device 2 detects that the user picks up telephone set 32, the second device 2 notifies the first device 1 of use's picking up the telephone set 32 via the IP network (S55). The first device 1 establishes a bidirectional communication between the first device 1 and second device 2 in response to the notification from the second device 2 (S56 and S57). Then, the first device 1 connects with the telephone line network 200 to communicate with a calling party (S58).

With the above procedure, the telephone communication between the second device 2 and the calling party is established. When the first device 1 receives a voice signal from the telephone line network 200 (S61), the voice signal is transferred, via the IP network 100, to the second device 2 (S62) so that the voice signal is output from the telephone set 32 of the second device 2 (S63).

Additionally, when the voice signal is input by the user of the second device 2 (S64), the voice signal is transferred to the first device 1 (S65) so that the voice signal is sent to the telephone line network 200 (S66).

According to the above configuration, by connecting the first device 1 and the second device 2 via the IP network 100, the telephone call or the facsimile message can be exchanged therebetween. Therefore, the user can use the second device 2 similarly to the first device. That is, the user can receive the telephone call, which is originally made to the first device, with the second device and/or the user can receive the facsimile message, which is originally sent to the first device, with the second device 2.

Hereinabove, the embodiments according to aspects of the present invention have been described. The present invention can be modified without departing from the scope of the invention.

For example, while the processes executed by the MFP are described in the above embodiments, the processes may be executed by a single function device such as a printer or a facsimile machine.

While the USB memory is used as the external device in the above embodiments, any other equivalents such as a memory card incorporating a flash memory may be used as the external device optionally or alternatively.

According to the embodiment, if the predetermined number of the telephone calls are received in the predetermined period, the first device 1 makes a telephone call to the administrator to confirm that the deletion is intended by the administrator, and the password or the authentication code stored in the first device 1 is deleted thereafter. Such a configuration is for preventing deletion of the password or the authentication code stored in the first device 1 from being executed too easily. If it is desired that the password or the authentication code is deleted easily, such a configuration may be modified so that the telephone call to the administrator is made in response to a single telephone call.

What is claimed is:

1. A network system including a first device, a second device connectable to the first device via an IP network and an external device detachably connectable to each of the first device and the second device, an address of the first device being stored in the external device, wherein the first device comprises:
a setting information storing unit configured to store setting information representing settings of the first device;
a first device control unit configured to control the first device in accordance with the setting information stored in the setting information storage; and
a first transmitting unit configured to transmit the setting information stored in the setting information storage unit in response to receipt of a sending request, which is a request to send setting information, transmitted from the second device via the IP network, and wherein the second device comprises:
a retrieving unit configured to retrieve the address stored in the external device when the external device is connected to the second device;
a second transmitting unit configured to transmit the sending request, which requests the setting information, to the first device via the IP network, based on the address retrieved by the retrieving unit;

a receiving unit configured to receive the setting information transmitted from the first device via the IP network; and a second device control unit configured to control the second device in accordance with the setting information received by the receiving unit.

2. The network system according to claim 1, wherein the first device further comprises:

a first interface configured to connect with the external device;

a writing unit configured to write the address assigned to the first device into the external device through the first interface;

a first acquiring unit configured to acquire the setting information, the setting information acquired by the acquiring unit being stored in the setting information storing unit; and a first receiving unit configured to receive the sending request;

wherein the second device further comprises:

a second interface configured to connect with the external device; and a second receiving unit configured to receive the setting information transmitted from the first device via the IP network.

3. The network system according to claim 2, wherein the first device further comprises a judging unit, wherein the setting information storing unit stores identification information identifying the external device connected with the first device via the first interface, wherein the writing unit writes the identification information stored in the setting information storing unit into the external device together with the address, wherein the first receiving unit receives identification information identifying the external device, when connected with the second device, from the second device via the IP network, wherein the judging unit judges whether the identification information transmitted from the second device and received by the first receiving unit is identical to the identification information stored in the setting information storing unit, wherein the first transmitting unit transmits the setting information to the second device if the judging unit judges that the identification information received by the first receiving unit is identical to the identification information stored in the setting information storing unit, wherein the retrieving unit retrieves the identification information stored in the external device connected with the second interface, wherein the second sending unit transmits the identification information retrieved by the retrieving unit to the first device, and wherein the external device is configured such that the address storing unit stores the identification information together with the address.

4. The network system according to claim 3, wherein the first device is configured such that:

the first acquiring unit acquires authentication information;

the setting information storing unit stores the authentication information acquired through the first acquiring unit;

the first receiving unit receives authentication information which is input in the second device and transmitted from the second device via the IP network;

the judging unit judges whether the authentication information, which is transmitted from the second device and received by the first receiving unit, is identical to the authentication information stored in the setting information storing unit; and the first transmitting unit transmits the setting information to the second device if the judging unit judges that the identification information and the authentication information received by the first receiving unit are identical to the identification information and the authentication information stored in the setting information storing unit, respectively, wherein, the second device further comprises a second input unit configured to input authentication information, and wherein the second transmitting unit transmits the authentication information input through the second input unit to the first device.

5. The network system according to claim 3, wherein the first device further comprises an information deleting unit configured to delete at least one of the identification information and the authentication information stored in the setting information storing unit of the first device.

6. The network system according to claim 5, wherein the first device further comprises a communicating unit configured to communicate with a communication terminal device through a telephone line network, and wherein the information deleting unit deletes at least one of the identification information and the authentication information stored in the setting information storing unit in response to an instruction for deleting the one of the identification information and the authentication information received through the communicating unit.

7. The network system according to claim 6, wherein the first device further comprises:

a telephone number storing unit configured to store a telephone number of an administrator;

a telephone number receiving unit configured to receive a telephone number of the communication terminal device via the telephone line network;

a telephone number judging unit configured to judge whether the telephone number received by the telephone number receiving unit is identical to the telephone number stored in the telephone number storing unit; and a calling unit configured to make a telephone call to the telephone number received by the telephone number receiving unit if the telephone number judging unit judges that the telephone number received by the telephone number receiving unit is identical to the number stored in the telephone number storing unit, and wherein the information deleting unit deletes at least one of the identification information and the authentication information stored in the setting information storing unit when the telephone call made by the calling unit is established.

8. The network system according to claim 2, wherein the second device further comprises a second setting information storing unit configured to store the setting information received by the second receiving unit.

9. The network system according to claim 8, wherein the second device further comprises a second information deleting unit configured to delete the setting information stored in the second setting information storing unit in response to disconnection of the external device from the second interface.

10. The network system according to claim 1, wherein the address assigned to the first device includes an IP address.

11. An information processing device connectable to an external network device via an IP network, an external device being detachably connectable to the information processing device, the information processing device comprising;
   a setting information storing unit configured to store setting information representing settings of the information processing device;
   a control unit configured to control the information processing device in accordance with the setting information stored in the setting information storing unit;
   a receiving unit configured to receive a sending request for the setting information from the network device; and
   a transmitting unit configured to transmit, to the external network device, the setting information stored in the setting information storing unit in response to receipt of the sending request, which is a request to send the setting information, from the external network device.

12. The information processing device according to claim 11, further comprising: an interface configured to detachably connect to the external device;
   a writing unit configured to write the address assigned to the information processing device so that the address is retrievable by the network device, into the external device through the interface;
   an acquiring unit configured to acquire the setting information of the information processing device, the setting information acquired by the acquiring unit being stored in the setting information storing unit; and
   a receiving unit configured to receive the sending request for the setting information from the network device.

13. The information processing device according to claim 11, wherein the address assigned to the information processing device includes an IP address.

14. The information processing device according to claim 11, wherein the address assigned to the external network device includes an IP address.

15. An information processing device connectable to a network device via an IP network, an external device, which is configured to store an address of the network device, being detachably connectable to the information processing device, the information processing device comprising:
   a retrieving unit configured to retrieve the address from the external device;
   a sending unit configured to send a sending request, which is a request to send setting information representing settings of the network device, to the network device via the IP network based on the address retrieved by the retrieving unit;
   a receiving unit configured to receive the setting information transmitted from the network device in response to the sending request via the IP network; and
   a control unit configured to control the information processing device in accordance with the setting information received by the receiving unit.

16. The information processing device according to claim 15, further comprising an interface configured to connect to the external device,
   the retrieving unit retrieving the address from the external device through the interface.

17. A network system including a first device, a second device connectable to the first device via an IP network and an external device detachably connectable to each of the first device and the second device, an address of the first device being stored in the external device,
   wherein the first device comprises:
      a processor; and
      memory storing computer readable instructions that, when executed, cause the first device to:
         store setting information representing settings of the first device in a setting information storage;
         control the first device in accordance with the setting information stored in the setting information storage; and
         transmit the setting information stored in the setting information storage in response to receipt of a sending request, which is a request to send setting information, transmitted from the second device via the IP network, and
   wherein the second device comprises:
      a processor; and
      memory storing computer readable instructions that, when executed, cause the second device to:
         retrieve the address stored in the external device when the external device is connected to the second device;
         transmit the sending request, which requests the setting information, to the first device via the IP network, based on the address retrieved;
         receive the setting information transmitted from the first device via the IP network; and
         control the second device in accordance with the setting information received.

18. An information processing device connectable to an external network device via an IP network, an external device being detachably connectable to the information processing device, the information processing device comprising;
   a processor; and
   memory storing computer readable instructions that, when executed, cause the information processing device to:
      store setting information representing settings of the information processing device in a setting information storage;
      control the information processing device in accordance with the setting information stored in the setting information storage;
      receive a sending request for the setting information from the network device; and
      transmit, to the external network device, the setting information stored in the setting information storage in response to receipt of the sending request, which is a request to send the setting information, from the external network device.

19. An information processing device connectable to a network device via an IP network, an external device, which is configured to store an address of the network device, being detachably connectable to the information processing device, the information processing device comprising:
   a processor; and
   memory storing computer readable instructions that, when executed, cause the information processing device to:
      retrieve the address from the external device;
      send a sending request, which is a request to send setting information representing settings of the network device, to the network device via the IP network based on the address retrieved;
      receive the setting information transmitted from the network device in response to the sending request via the IP network; and
      control the information processing device in accordance with the received setting information.

* * * * *